US006449460B2

(12) United States Patent
Logan

(10) Patent No.: US 6,449,460 B2
(45) Date of Patent: Sep. 10, 2002

(54) TEACHING METHOD AND KIT

(76) Inventor: Marie G. Logan, 2831 W. Keogh Ct., Visalia, CA (US) 93291

( * ) Notice: Subject to any disclaimer, the term of this patent is extended or adjusted under 35 U.S.C. 154(b) by 0 days.

(21) Appl. No.: 09/826,769

(22) Filed: Apr. 4, 2001

Related U.S. Application Data

(60) Provisional application No. 60/202,714, filed on May 8, 2000.

(51) Int. Cl.[7] .......................... G09B 5/00; G09B 21/00; G09B 5/04; G09B 25/00

(52) U.S. Cl. ..................... 434/308; 434/112; 434/309; 434/317; 434/318; 434/319; 434/365

(58) Field of Search .................................. 434/112, 116, 434/156, 167, 169, 178, 185, 308, 309, 311, 317, 318, 319, 365; 84/470 R

(56) References Cited

U.S. PATENT DOCUMENTS

| | | |
|---|---|---|
| 1,236,333 A | 8/1917 | Mayhew |
| 1,645,008 A | 10/1927 | Kahn |
| 2,524,143 A | 10/1950 | Smith |
| 3,942,268 A | 3/1976 | Wilson |
| 4,124,943 A | 11/1978 | Mitchell et al. |
| 5,558,520 A | 9/1996 | Werzberger |
| 5,954,515 A | 9/1999 | Iggulden |
| 5,967,556 A | 10/1999 | Conley, Jr. |

OTHER PUBLICATIONS

Agrotou, A., "Isolation and the Multi–Handicapped Patient: An Analysis of the Music Therapist–Patient Affects and Processes", *The Arts in Psychotherapy*, vol. 21 No. 5, pp. 359–365 (1994).

Barringer, M. and Liesman, C., "Stimulating our Senses: A Summer Enrichment Curriculum of Sensory Experiences for Severely Mentally and Multiply Impaired Students", Detroit, MI: Wayne County Intermediate School District, (1982) (ERIC Document Reproduction Service No. ED 224 210).

Barringer, M. and Kosal–Smither, C., "Really Together Now! A Resource and Activity Guide for the Developmentally Disabled. Molehills out of Mountains", Washington, D.C.: Department of Education, (1985) (ERIC Document Reproduction Service No. ED 260 524).

Boone, P. "Music: An Integrative Approach to Learning for the Severely and Profoundly Retarded", In L.H. Kearns, M.T. Ditson, and B.G. Roehner (Eds.), *Readings: Developing Arts Programs for Handicapped Students*, Lancaster, PA: Pennsylvania State Department of Eduction, (pp. 95–97) (1981) (ERIC Document Reproduction Service No. ED 213 213).

Burkhardt–Mramor, K., "Music Therapy and Attachment Disorder: A Case Study", *Music Therapy Perspectives*, vol.14, pp. 77–82 (1996).

(List continued on next page.)

*Primary Examiner*—John Edmund Rovnak
(74) *Attorney, Agent, or Firm*—David Weiss

(57) ABSTRACT

A method and kit for teaching disabled students, such as children with developmental delays and disabilities such as autism, through music. The method makes extensive use of an illustrated song book and individual sound recordings of appropriate songs with lyrics, and tying the pages of the song book with the individual sound recordings of the songs by the use of icons or graphic images, including icon cards, representing respective ones of the songs. The method permits the students to find the appropriate page in the song book for following along as the selected song is being played, while also permitting the students to have a choice in the selection of songs to be experienced. The method and kit also provide the teacher with suggestions of activities for engaging the children, such activities being specific to the selected song being played.

31 Claims, 5 Drawing Sheets-

OTHER PUBLICATIONS

Caouette, M. and Reid, G., "Influence of Auditory Stimulation on the Physical Work Output of Adults who are Severely Retarded", *Education and Training in Mental Retardation,* Mar. 1991, pp. 43–52.

Frost, L.A. and Bondy, A.S., *PECS: The Picture Exchange Communication System Training Manual,* Pyramid Educational Consultants, Inc., Cherry Hill, NJ (1994).

Hairston, M.J.P., Analyses of Responses of Mentally Retarded Autistic and Mentally Retarded Nonaustistic Children to Art Therapy and Music Thereapy. Journal of Music Therapy, vol. 27 No. 3, pp. 137–150, (1990).

Hutinger, P.L., "Expressive Arts Project for Young Children with Disabilities", Washington, D.C.: Office of Special Education and Rehabilitative Services. (1996) (ERIC Document Reproduction Service No. ED 409 682).

Kohn, M. and Williams, J., "Integrative Arts Activities Guide for the Severely and Profoundly Handicapped", Washington, D.C.: National Committee, Arts for the Handicapped (1980) (ERIC Document Reproduction Service No. ED 232 370).

Logan, M., "Use of Music in the Instruction of Children with Severe and Profound Developmental Delays and Disabilities", Project report in partial fulfillment for the Degree of Master of Arts in Special Education at California State University, Fresno, submitted Nov. 11, 1998 (unpublished).

Markson, E.W., "Review Essay: The Creative Arts and Aging", *The Gerontologist,* vol. 26 No. 3, pp. 330–333, (1986).

May, D.C. and McKenny, S., "Maintaining Appropriate Body Positions Through the Use of a Motivating Electronic Device", San Fransicso: Paper presented at The Association for the Severely Handicapped 10th Annual Conference, (1983) (ERIC Document Reproduction Service No. ED 245 453).

Pedigo, J., "Music Techniques with Severely/Profoundly Handicapped Students", Indianapolis, IN: Very Special Arts of Indiana, Indianapolis. (1986) (ERIC Document Reproduction Service No. ED 277 195).

Pyramid Educational Consultants, Inc., *Sample Picture Exchange Communication System Objectives* (2 pages) (1997).

Simpkins, P. "The Emotionally Disturbed Child and Music", In L.H. Kearns, M.T. Ditson, and B.G. Roehner (Eds.), *Readings: Developing Arts Programs for Handicapped Students,* Lancaster, PA: Pennsylvania State Department of Eduction, (pp. 118–122) (1981) (ERIC Document Reproduction Service No. ED 213 213).

Starke, M.C. and Wright, J., "Improving the Work Performance of Mentally Retarded Clients in a Sheltered Workshp", *B.C. Journal of Special Education,* vol. 10 No. 4, pp. 359–365 (1986).

Steele, A.L., "Music Therapy: A Community Resource for Children with Special Needs", *Child Welfare,* vol. 63 No. 6, pp. 563–568 (1984).

Sullivan, M.W., Laverick, D.H., Lewis, M., "Fostering Environmental Control in a Young Child with Rett Syndrome: A Case Study", New Brunswick, NJ: Institute for the Study of Child Development, (1994) (ERIC Document Reproduction Service No. ED 376–643 ).

Upitis, R., "A Special Needs Music Community: Color and the Computer", Toronto, ON: Ontario Department of Education (1988) (ERIC Document Reproduction Service No. ED 298 032).

Walker, J., "Music for the Moderately and Severely Handicapped", Monmouth, OR: Teaching Research Division Oregon State System of Higher Education (1982) (ERIC Document Reproduction Service No. ED 245 504).

Williams, L.E., "A Band that Exceeds All Expectations", *Music Educators Journal,* vol. 71 No. 6, pp. 26–29 (1985).

Wilson, T., and Fredericks, B., "Teaching Research Music Program for Moderately and Severely Handicapped Children", Monmouth, OR: *Teaching Research Infant and Child Center,* vol. 11, No. 1 (1982) (ERIC Document Reproduction Service No. 228 767).

Wylie, M.E., "A Case Study to Promote Hand Use in Children with Rett Syndrome", *Music Therapy Perspectives,* vol. 14 No. 2, pp. 83–86.

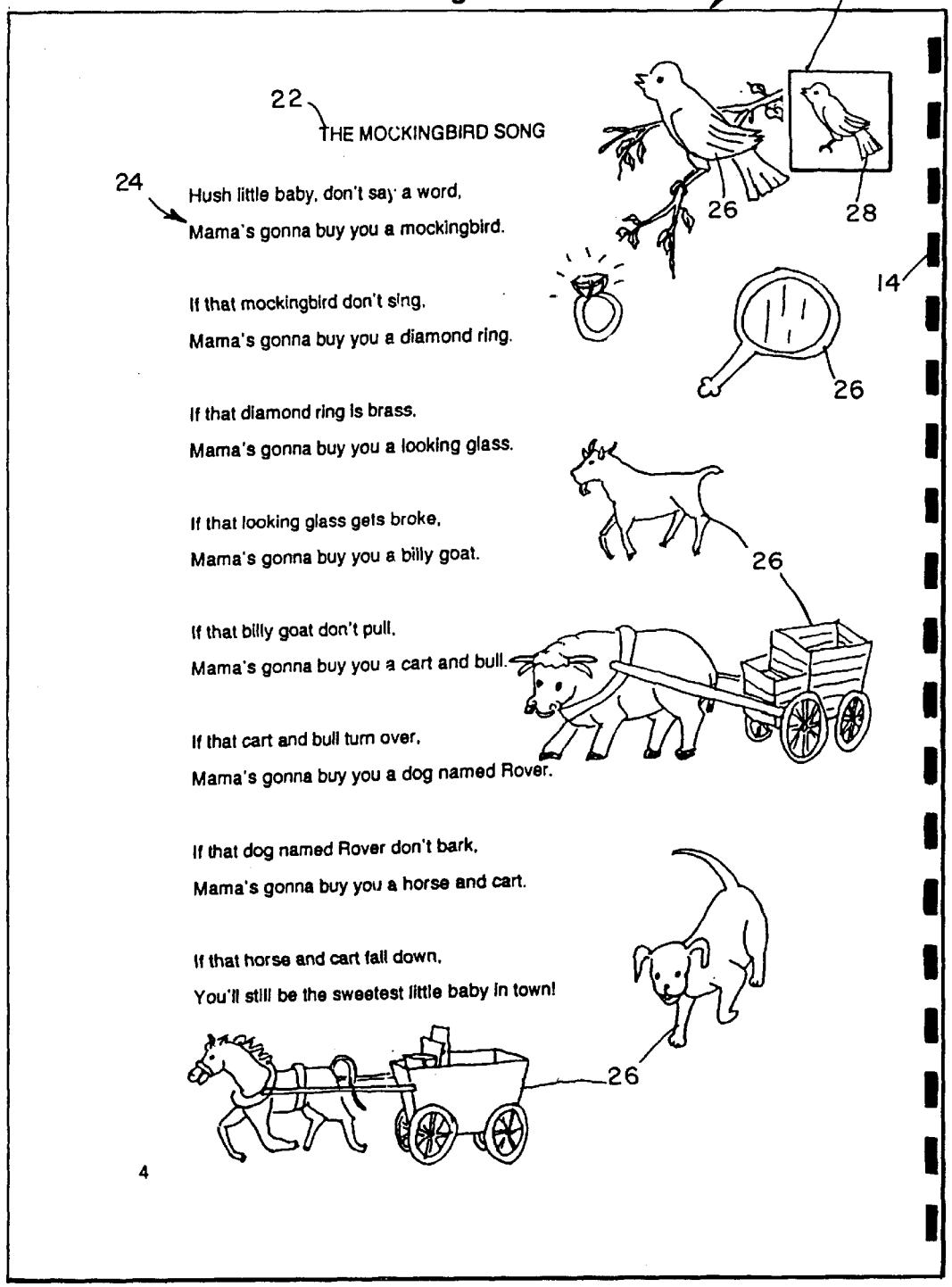

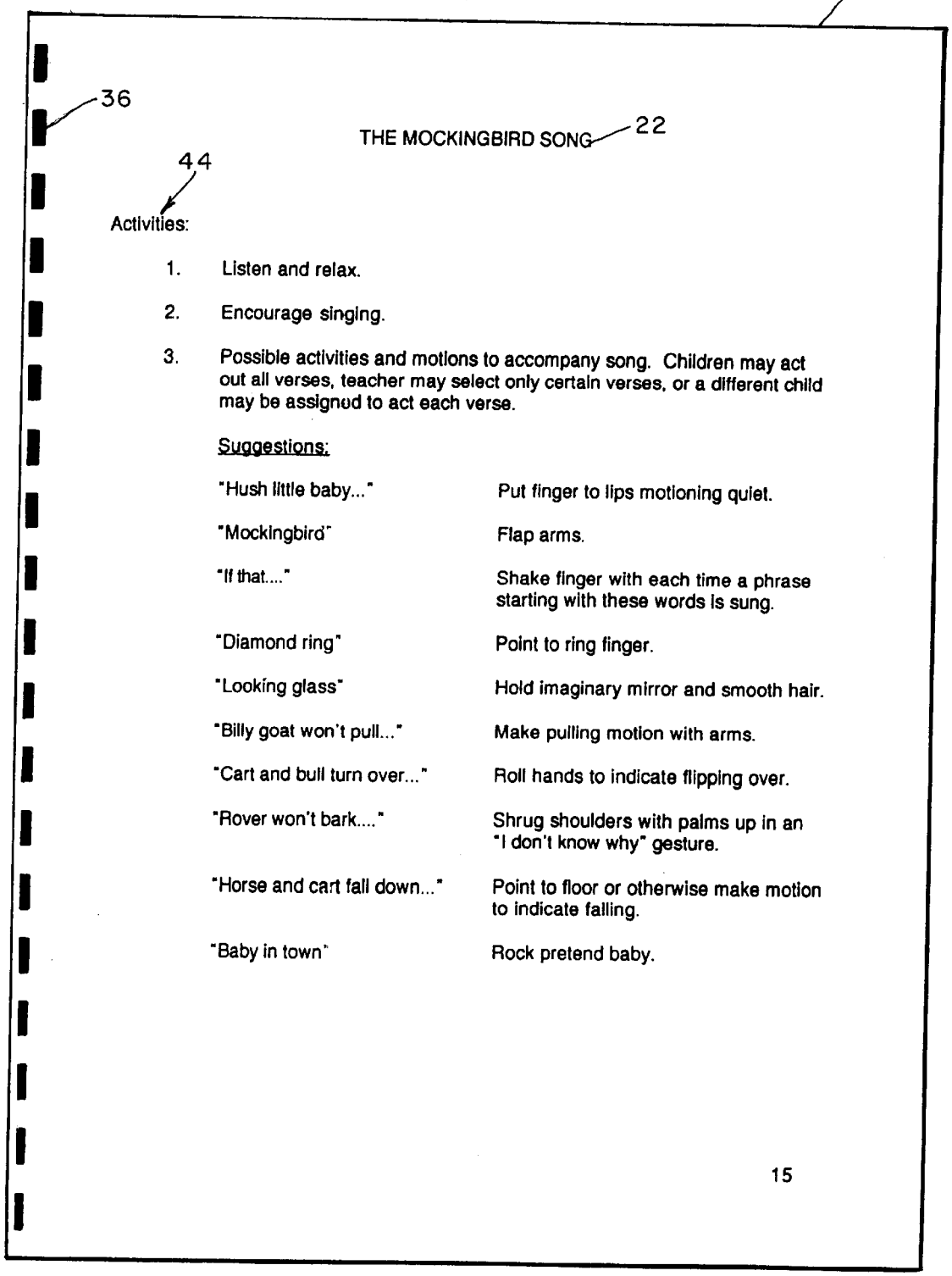

TEACHING METHOD AND KIT

CROSS REFERENCE TO RELATED APPLICATION

This application claims the benefit of U.S. Provisional Patent Application No. 60/202,714, filed May 8, 2000, which application is incorporated herein by reference.

TEACHING METHOD AND KIT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

This invention relates to music-based teaching systems, and more particularly to methods and kits for encouraging developmentally delayed or disabled children to interact through music and music-related activities.

BACKGROUND OF THE INVENTION

Music has been used for several years in working with children with severe developmental delays and disabilities such as autism. My own experiences in this connection began with my conducting "sing-along" sessions with groups of such children, playing my guitar and singing children's and folk songs while encouraging participation by the group. This developed into my providing the children with small song books and later in my experimenting with recording performances of several of the songs on a tape cassette and playing back the recorded songs while encouraging group participation through use of the song books.

The impact these music sessions have had on the children was quite noticeable, and I was curious to learn of the experiences of other professionals using music in working with this population of people with extreme disabilities. I chose to research the topic in partial fulfillment for the Degree of Masters of Arts in Special Education, and my project report entitled "Use of Music in the Instruction of Children with Severe and Profound Developmental Delays and Disabilities" was submitted on Nov. 11, 1998 to California State University, Fresno, School of Education and Human Development. Although this project report has not been published nor has it otherwise been made available to the public, a portion of the report is of interest to the background of the present invention in that it describes specific curricula concerning music therapy or music instruction offering goals of attending, responding, imitating and/or self initiation by developmentally delayed or disabled children.

In one curriculum for students with severe mental and physical impairments, Barringer and Liesman (1982) described a variety of activities including several based on music which were designed to stimulate gross motor movement. One example of an activity used the song "Shake" by Best of Buddha. While listening to the song, the children were to shake any part of their body they could. Another example used the song "Streamers" by Hap Palmer. Arms or legs were tied with crepe paper streamers and the children were encouraged to move them in rhythm with the song. The objectives for both of these activities were to have students respond to the sensory stimuli with a change in facial expression and/or body position and to have the students respond with a gross motor pattern when presented with music stimuli.

Barringer and Kosal-Smither (1985) presented an activity guide, designed for use with a large group of students with severe developmental delays. It offered a thematic approach to planning, and included activities with cooking, creative movement, and music, with music again being an important part of their offering. Their music activities were designed to teach cognitive, psychomotor and affective objectives. Music selections were chosen to allow work on the students' instructional objectives. A sample lesson plan included a hello song, a motor song (any song to encourage motor movements), an expressive song (to encourage sound-making), a receptive song (listen and perform the required task), a one-step command song, an academic song, an emotional or social song, and a goodbye song. It was recommended that the hello and goodbye songs remain the same for every session. They chose their songs from various albums of children's and popular music. Each of the ten complete music lesson plans consisted of eight recommended songs from various albums by well-known recording artists. The lessons were designed for children with at least good receptive communication skills and motor control, and assumed accessibility to numerous recordings.

Another curriculum, this one specifically offering music techniques for use with students with severe and profound disabilities, was developed by Pedigo (1986). She offered four levels of participation: awareness, attention, imitation, and self-initiation. Precise definitions of the response levels and clear, simple to follow activity plans were offered. Pedigo based her project upon the observation that students with severe and profound handicaps can learn important skills through music. In her introduction, she stated the belief that it is apparent that this population of students can respond at more complex levels than once though possible. The purpose of her activities was not to teach music, but to use music as a tool to teach other useful behaviors. Examples of some of the behaviors in each category sought are eye contact for awareness, reaching toward and/or touching the instrument for attending, duplication of the teacher's motion for imitation, and beginning or originating a movement or action for self-initiation. She too, believed in the use of music as a strong motivator.

An earlier guide to the use of the arts in populations with severe and profound disabilities was offered by Kohn and Williams (1980). The Kohn and Williams arts activity guide, including the category of music, aimed at three levels of development: awareness, imitation, and self-initiation. While the document did not report results of testing, it did offer a multitude of clear, concise, and interesting activities, including a substantial number with a musical motif.

These authors have presented curricula which use music as a tool in the attainment of other goals. Pedigo (1986) used music to teach a variety of useful behaviors such as eye contact and attention to the instructor or task. The Barringer and Liesman (1982) curriculum used music to develop gross motor skills. The Barringer and Kosal-Smither (1985) curriculum used music to teach cognitive, psychomotor, and affective skills. The Kohn and Williams (1980) arts curriculum and Pedigo's (1986) music curriculum were developed to meet a variety of cognitive levels. Each one advocates the use of music in special education for the severely disabled.

The publications of the authors referred to above, each of which is identified below, are incorporated herein by reference as indicative of the background of the present invention and as illustrating the state of the art:

Barringer, M. and Liesman, C., Stimulating our Senses: A Summer Enrichment Curriculum of Sensory Experiences for Severely Mentally and Multiply Impaired Students. Detroit, MI: Wayne County Intermediate School District. (ERIC Document Reproduction Service No. ED 224 210) (1982)

Barringer, M. and Kosal-Smither, C., Really Together Now! A Resource and Activity Guide for the Developmentally Disabled. Molehills out of Mountains. Washington, D.C.: Department of Education, (ERIC Document Reproduction Service No. ED 260 524) (1985)

Kohn, M. and Williams, J., Integrative Arts Activities Guide for the Severely and Profoundly Handicapped. Washington, D.C.: National Committee, Arts for the Handicapped. (ERIC Document Reproduction Service No. ED 232 370) (1980)

Pedigo, J., Music Technigues with Severely/Profoundly Handicapped Students, Indianapolis, Ind.: Very Special Arts of Indiana, Indianapolis. (ERIC Document Reproduction Service No. ED 277 195) (1986)

SUMMARY OF THE INVENTION

Reflecting upon my own experiences and the various curricula discussed in the literature as noted above, it occurred to me that further development of music-based curricula and materials were needed for better engaging children with severe developmental delays and disabilities to participate in activities through the sharing of music. Of specific concern to me was the creation of methods and materials for permitting a generally non-communicative child to have a choice as to which song he or she would like to experience, and for encouraging participation in activities through the sharing of music, and in so doing teaching the disabled child some measure of subjects including reading, counting and number recognition, group skills, interpersonal skills, leisure skills and critical thinking skills, while at the same time permitting the child to experience music for its own sake.

The teaching method of my invention attempts to accomplish these goals, according to one aspect thereof, by making extensive use of an illustrated song book and individual sound recordings of appropriate songs with lyrics, and tying the pages of the song book with the individual sound recordings of the songs by the use of icons or graphic images representing respective ones of the songs. The method permits the students to find the appropriate page in their song book for following along as a selected song is being played, while also permitting the students to have a choice in the selection of songs to be experienced. At the same time, the method and materials of the present invention provide the teacher with suggestions of activities for engaging the children, such activities being specific to the selected song being played.

Cards having printed thereon icons or graphic representations of the various recorded songs may be utilized in practicing certain aspects of the method of the present invention. Picture cards have been previously used in teaching systems for developmentally delayed or disabled children, such as the well-known Picture Exchange Communication System (or "PECS"), wherein a disabled child is taught to give a picture of a desired item to a communicative partner (a trainer or teacher) in exchange for that item. As will be appreciated from the description herein of the present invention, the manner in which the present invention utilizes pictures or icon cards differs significantly from the teaching of PECS.

A preferred embodiment of the method of teaching disabled students, such as children with developmental delays and disabilities such as autism, through music in accordance with the present invention, comprises: providing each student with a song book including pages each having printed thereon the title of a different song of a plurality of songs, the lyrics of that song, and an icon representing that song from a plurality of icons respectively representing the songs; providing sound recordings of performances of such songs the lyrics of which are printed on the song book pages; providing a plurality of icon cards each having thereon a one of such icons; selecting one of the icon cards for identifying a song represented by the icon on the selected icon card; displaying to the students the selected icon card for permitting each student to find the page in his or her song book having thereon the title and lyrics of the identified song by matching the icon on the displayed icon card to one of the icons on the pages of his or her song book; and playing back the sound recording of the song identified by the icon on the selected icon card. During the playing back of the sound recording, the students may view the page having the matched icon and are encouraged to sing along to the recording being played back.

In one preferred manner of practicing this method, a teacher is provided with an activity book including first pages respectively having printed thereon the title and lyrics of such songs, the activity book including second pages in respective correspondence with the first pages and having printed thereon suggested activities that may be implemented in connection with a performance of the song the lyrics of which are printed on a corresponding one of the first pages. The teacher selects an activity from the second page of the activity book corresponding to the first page having thereon the lyrics of the identified song, and the teacher thereupon implements the selected activity with the students during the recording playing back step.

The provided sound recordings preferably comprise individual recordings of respective ones of the songs, with the packaging of each of the individual recordings being marked with the icon representing the song on that particular recording. One of the students may match the icon on the displayed icon card with an icon on the packaging of a one of the individual recordings for identifying the recording to be played back. The student may then cause the identified sound recording to be played back during the playing back step. Alternatively, the student may hand the identified sound recording to a teacher, and the teacher may cause the identified sound recording to be played back during the playing back step.

The present method of teaching disabled students through music may be practiced on an individual basis with a disabled student, the method comprising: providing the student with a song book including pages each having printed thereon the title of a one song of a plurality of songs, the lyrics of that song, and a one icon representing that song of a plurality of icons respectively representing such songs; providing a plurality of sound recordings of performances of such songs the lyrics of which are printed on the song book pages, the packaging of each of the recordings marked with the icon representing the song on that recording; the student matching the icon on a one of the pages of the song book to the icon on the packaging of a one of the recordings; and playing back the recording having the matched icon. The student may cause the sound recording having the matched icon to be played back during the playing back step. Alternatively, the student may hand the sound recording having the matched icon to a teacher, and the teacher may cause such sound recording to be played back during the playing back step.

The present invention further includes a kit of materials for practicing the method of the invention and variations thereof. A preferred embodiment of the kit comprises the combination of: at least one song book including pages each having printed thereon the title of a one song of a plurality of songs, the lyrics of that song, and a one icon representing that song of a plurality of icons respectively representing such songs; sound recordings of performances of the songs the lyrics of which are printed on the pages; and a plurality of icon cards each having thereon a one of the icons. The sound recordings may comprise a master recording of performances of at least some and preferably all of such songs. Preferably, however, the sound recordings comprise individual recordings of respective ones of the songs, the packaging of each of the individual recordings being marked with the icon representing the song on that individual recording. The individual recordings may be originally provided as part of the kit, or they may be produced through duplicating the sound recordings of the individual song performances on the master recording. It is preferred that the icons on the song book pages, the icons on the packaging of the individual sound recordings, and the icons on the icon cards, are printed such that they are consistently identifiable as icons by the students. Each one of the icons on the song book pages is preferably contained within an identifiable graphic border, and each one of the icons on the packaging of the individual recordings and on the icon cards are contained within a graphic border similar to the graphic borders on the song book pages.

The kit preferably further includes an activity book including first pages (or song book pages) respectively having printed thereon the title and lyrics of the songs, the activity book including second pages (or activity guide pages) in respective correspondence with the first pages and having printed thereon suggested activities that may be implemented in connection with the performances of the song the lyrics of which are printed on a corresponding one of the first pages. The pages of the children's song books and the first pages of the activity book preferably have printed thereon illustrations corresponding in location and context to the song lyrics.

A kit that may be used with the present invention, in connection with an individual disabled student, may comprise: a plurality of sound recordings of performances of songs, each of the sound recordings having packaging marked with an icon representing the song on that recording; and a song book including pages each having printed thereon the title of a one of such songs, the lyrics of that song and the icon representing that song. The pages of the song book may be as previously described, and the kit may include a plurality of icon cards as well as an activity book.

BRIEF DESCRIPTION OF THE DRAWINGS

The novel features which are believed to be characteristic of the invention, together with further advantages thereof, will be better understood from the following description considered in connection with the accompanying drawings in which a preferred embodiments of the present invention are illustrated by way of example. It is to be expressly understood, however, that the drawings are for the purpose of illustration and description only and are not intended as a definition of the limits of the invention.

FIG. 2 is a plan view of one of the pages of FIG. 1, shown in readable detail;

FIG. 4 is a plan view of the "Activities" page of FIG. 3, shown in readable detail;

DETAILED DESCRIPTION OF THE PREFERRED EMBODIMENTS

Figure 1:
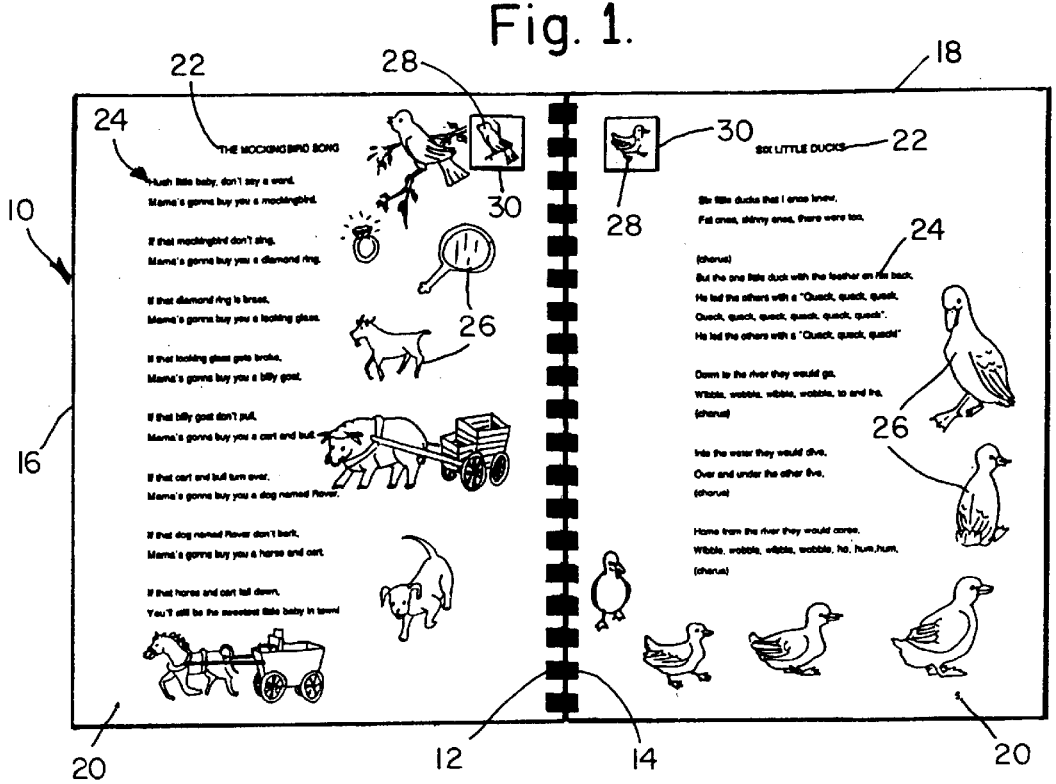
FIG. 1 is a plan view of an example of a song book, in open configuration, showing representations of two typical pages thereof.

The "song book" 10 represented in FIG. 1 contains the lyrics of a plurality of songs suitable for children, with each page having thereon the title and lyrics of a different song. The book includes front and rear covers, with its pages therebetween, held together in conventional manner along a spine area that may include a spiral or ringed binding 12 cooperating with apertures 14 along an edge of each page. By way of example, two pages are shown in the book's open configuration of FIG. 1, specifically a left page 16 and a right page 18 (as viewed in the drawing of FIG. 1), having respective page numbers 20 (e.g. left page 16 having page number "4" indicated in the lower left corner thereof, and page number "5" in the lower right corner of right page 18). Each of the pages has printed thereon a song title 22 followed by the lyrics 24 of that song and preferably drawings or illustrations 26 corresponding in location and context with the lyrics 24 of the particular song 22.

Each page has printed thereon, at a consistent location such as the upper corner of each page adjacent the binding 12, an icon 28 or graphic image pictorially representing the particular song contained or starting on that page, each icon 28 being contained within a consistently identifiable graphic border or enclosure such as a printed square 30.

In the example of the page 16 shown in FIG. 1 and in more readable detail in FIG. 2, the page 16 has contained thereon the lyrics of the song with title 22 of "The Mockingbird Song", and shows an icon 28 of a mockingbird within square enclosure 30 located at the upper right corner of the page 16. The various graphic illustrations 26 correspond positionally and contextually to various portions of the song's lyrics 24. For example, in The Mockingbird Song lyrics set forth on the page 16, a graphic representation 26 of a mockingbird corresponds to the first sentence or verse of the song's lyrics 24

"Hush little baby, don't say a word,

Momma's gonna buy you a mockingbird."

The representation 26 of a diamond ring corresponds to the second verse of the song lyrics 24

"If that mockingbird don't sing,

Momma's gonna buy you a diamond ring."

The representation 26 of a hand-held mirror corresponds to the lyrics 24 of the song's third verse "If that diamond ring is brass,
Momma's buy you a looking glass."

Similarly, the graphic representations 26 of a billy goat, of a cart and bull, of a dog, and of a horse and cart, respectively correspond to the context of the fourth, fifth, sixth and seventh verses of the song's lyrics 24.

The song book 10 preferably contains a "Table of Contents" listing each song by song title 22 and page number 20. The list in the table of contents may also include the appropriate icon 28 in proximity to the song title 22 corresponding thereto, for assisting the child or student in finding the page corresponding to the lyrics of a particular song. In practicing the method of the present invention, a song book 10 is distributed to each child or student taking part in a learning session.

Figure 3:
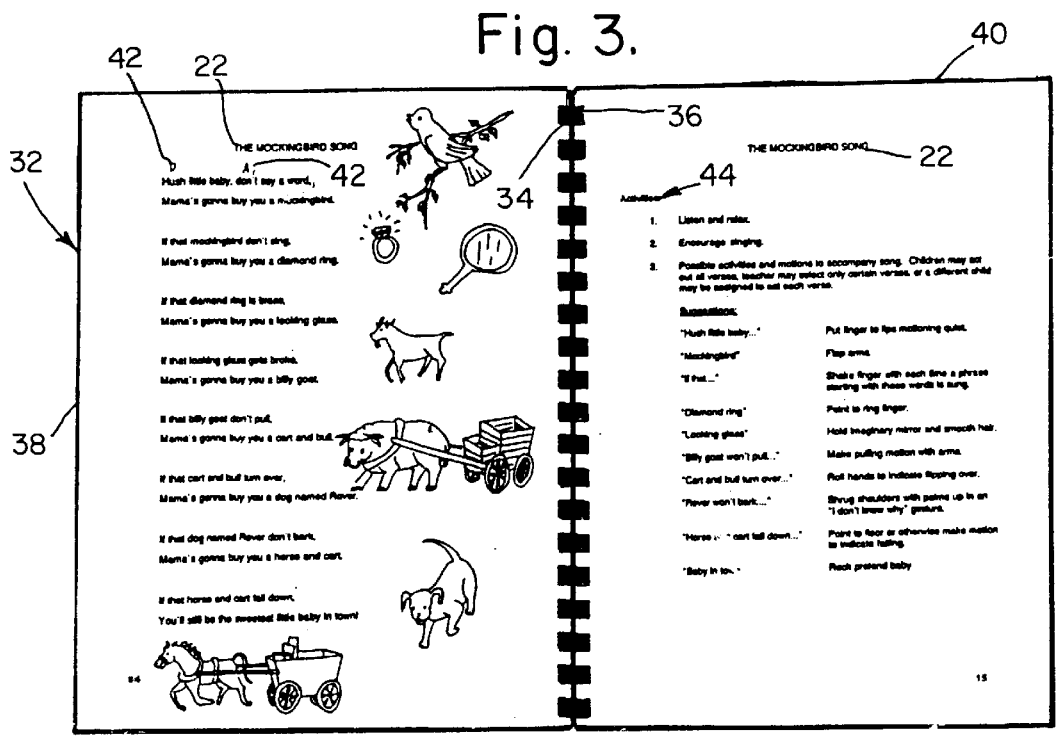
FIG. 3 is a plan view of an example of a song book and activity guide, in open configuration, showing representations of two typical side-by-side pages thereof.

The materials for practicing the teaching method of the present invention further include a "song book and activity guide" or activity book 32 represented in FIG. 3. The activity book 32 includes front and rear covers, with its pages therebetween, held together in conventional manner along a spine area that may include a spiral or ringed binding 34 cooperating with apertures 36 along an edge of each page. By way of example, two pages are shown in the book's open configuration of FIG. 3, specifically a left page 38 containing the lyrics of a song contained in the child's song book 10 (FIGS. 1 and 2), and a right page 40 upon which is printed suggestions to the leader or teacher of activities for conducting the learning session. When the book 32 is opened to a song lyrics page as shown in FIG. 3, the content of the opened activities page 40 corresponds to the lyrics of the song printed on the open opposite lyrics page 38. The pages 38 and the pages 40 are in respective correspondence, i.e. for each song book page 38 there is a corresponding activities guide page 40, preferably positioned opposite one another when the guide book 32 is opened to song book page 38.

In FIG. 3, the teacher's activity book 32 is turned to the opposite corresponding pages 38 and 40 for "The Mockingbird Song" for which the lyrics 24 and icon 28 are shown on the page 16 of the children's song book 10 (FIG. 1). In the book 32, the left page 38 includes the title 22 "The Mockingbird Song" followed by the lyrics 24 therefor, as well as the illustrations or graphic representations 26 shown on the page 16 of FIG. 1. The icon 30 may but need not be included on the song lyrics page 38 of the teacher's activity book 32. Also, if desired, the page 38 may include musical chord notations, such as the guitar chords 42, in the event the teacher or group leader has the knowledge and inclination to play the guitar or other instrument for providing live instrumental accompaniment to the singing during a learning session.

Figure 5:
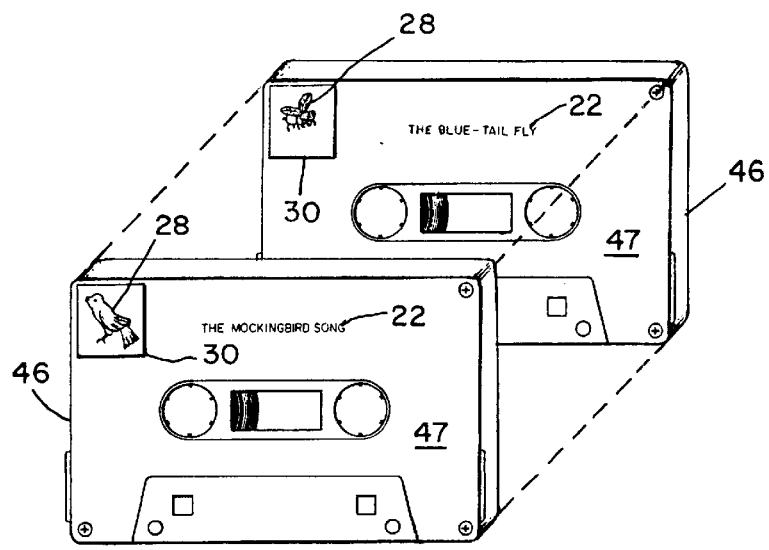
FIG. 5 represents individual cassette sound recordings for each song having lyrics included in the song book of FIG. 1.

The materials of the present invention include a plurality of music sound recordings, one for each song having lyrics contained on the various pages of the song book 10 and the activity book 32. These recordings may be in the form of tape cassette recordings 46 as represented in FIG. 5, each cassette 46 having the performances of the words and music of a different song recorded thereon (the same song is preferably recorded on each "side" of the cassette to avoid the necessity of rewinding).

The song's icon 28 and the song's title 22 are marked on the packaging of each of the sound recordings. In the case of tape cassette recordings 46, the housing 47 of each tape cassette recording 46 is marked with the song title 22 and the song's icon 28 for each song in the song book 10. If the cassettes (i.e. the tape recordings with their housings 47) are contained in respective boxes or other containers, as is common, or even in respective plastic bags, then such box or container or bag may be considered to be the packaging for the sound recording and may be marked with the appropriate icon 48.

The activities page 40 corresponding to and preferably opposite the song page 38, includes a list of suggested activities 44 following the song's title 22, for facilitating the students' acting out and singing along when the song is being played. The list of suggested activities 44 shown on the activities page 40 in FIG. 3 and in more readable detail in FIG. 4, is for facilitating the students' acting out and singing along when the associated song (i.e., "The Mockingbird Song" in this example) is being played by playback of the appropriate tape cassette recording 46 and/or by the teacher's providing a live song performance such as by singing while playing a guitar or another instrument. For example, if The Mockingbird Song were selected and played, the activities may be to first request the children to listen to the song (music and lyrics) being played and relax, and then to encourage the children to sing along. The list contains possible activities and motions for the children to accompany the song being played; the children may act out all verses, or the teacher may select only certain verses, or a different child may be assigned to act out each verse. As indicated in FIG. 4, a suggested acting-out may be to put a finger to one's lips motioning quiet when the phrase "Hush little baby" is played; to flap one's arms when the word "mockingbird" is played; to shake a finger each time a phrase starting with the words "If that . . ." is sung. Other acting out suggestions are noted in FIG. 4.

The activity book 38 may also include suggestions for additional or extension activities. For example, various pages of the book 38 may include drawings of song-related animals or objects, which may be photocopied by the teacher on heavy paper, colored, and glued or taped to sticks, resulting in stick puppets for the children to use when acting out a song. The children may help in the preparation of such stick puppets as may be appropriate, such as by assisting with the coloring or painting of the represented animals and other objects. Such stick puppets may be of particular use and enjoyment in connection with the preparation for and the acting out of such songs as "Old MacDonald Had a Farm".

Figure 6:
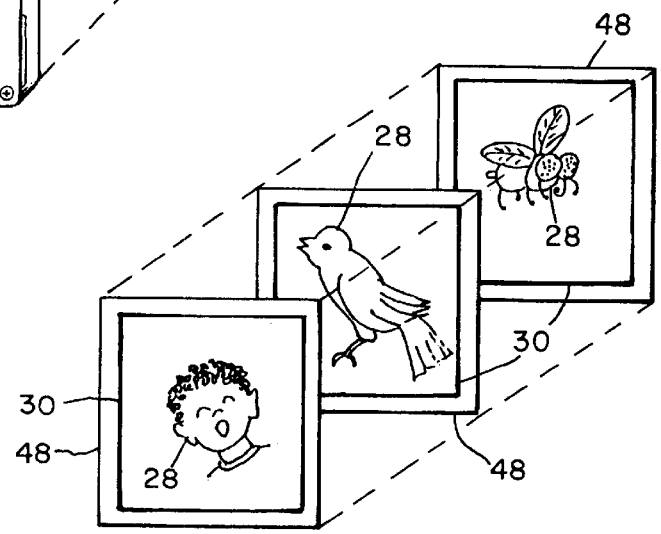
FIG. 6 is a representation of a plurality of cards each including an icon thereon corresponding to the icons shown on the various pages of the song book of FIG. 1 and on the sound recording cassettes of FIG. 5.

The icons 28 and their use represent an important aspect of the teaching method and kit of the present invention. As represented in FIG. 6, the system includes a set of icon cards 48, each card 48 having thereon the graphic image or icon 28 representing a particular song contained in the song book 10. Each icon 28 may be contained within the same border or enclosure 30 as associated with the icons 28 on the pages of the song book 10. The set of icon cards 48 includes one icon card 48 with associated icon 28 corresponding to the icon 28 shown on each song lyrics page of the song book 10 as well as the corresponding icon 28 on the set of respective recordings 46 (FIG. 5). For example, the icon card 48 depicting a mockingbird (FIG. 6) corresponds to the mockingbird icon 28 of the song book's page 16 containing "The Mockingbird Song" (FIGS. 1 and 2) and further corresponds to the mockingbird icon 28 represented on the housing and/or other packaging of the recording 46 of "The Mockingbird Song" (FIG. 5).

The icon cards 48, along with the icons 28 on the pages of the book 10 and the icons 28 on the cassettes 46, permit a generally non-communicative child to have a choice as to which song he or she would like to experience. The child may select a card 48 having a particular icon 28 thereon, which the child associates with a particular song in the song book 10. The child then matches the selected icon card 48 with the same icon 28 on the packaging of one of the cassettes 46, perhaps as well as with the same icon 28 on a page of his or her song book 10 (or to an icon 28 on the song book's Table of Contents page for assistance in identifying the page number for the selected song). In such manner, the child may pick up the selected cassette and either give it to the teacher to play or the child may insert it himself/herself in the tape cassette player, and he/she may open his/her song book 10 to the lyrics page corresponding to the selected song. Alternatively, the child may first select the song from a page on his/her song book 10, noting the icon 28 printed on that page; he/she may then match the selected page icon 28 to an icon card 48, and use the icon card 48 for matching the icon 28 on a cassette 46 to obtain the cassette recording 46 containing the selected song. A child who lacks the ability to pick up an icon card 28 may simply point to the card of his/her selection.

The icon system described above permits a child to select and play a song, the child doing so either individually or as a part of a group of children. A listening center with a library of cassettes 46 may be made available to the child, and he/she may use the icons 28 to identify a particular recording of his selection and to insert the selected recording 46 in an available tape cassette player for playback and follow or sing along using his/her song book 10, or just to listen and relax.

Alternatively, the teacher may distribute two or three of the icon cards 48 to each child, based upon the teacher's knowing which songs are favored by a particular child. The teacher may then add another icon card 48 to each child's store of such cards in order to give the child a new choice. In a group situation, after a child selects a particular song, the teacher may follow the suggested activity plan for that song as set forth in the activity book 32.

The preferred embodiment of a kit of the materials for practicing the various aspects of the teaching method of the present invention includes the following items:

(1) At least one song book 10 (represented in FIG. 1), for use by the children. If only one book 10 is included in the kit, provision may be made for duplication of the book by the teacher so that each child in the group may have access to a song book 10.

(2) One activity book 32 (represented in FIG. 3), for the teacher's use.

Figure 7:
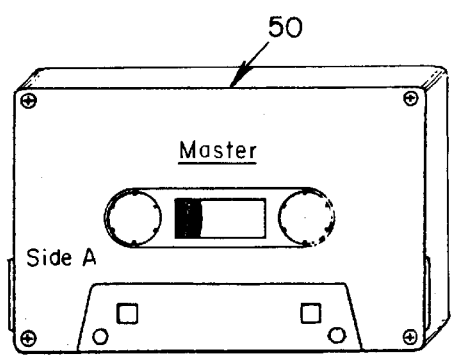
FIG. 7 represents a master recording of all of the songs having lyrics contained on the pages of the song book of FIG. 1.

(3) A set of sound recordings, such as the tape cassette recordings 46 represented in FIG. 5, with associated icons 28 on the cassette housings 47 and/or on other packagings for the cassettes 46, one cassette 46 for each song in the song book 10. Alternatively, a master sound recording of all songs contained in the song book 10, as represented by the master tape cassette recording 50 shown in FIG. 7, and provision may be made for duplicating the songs on the master cassette 50 onto respective individual tape cassettes 46 represented in FIG. 5. If desired, the kit may include both the master cassette 50 and the set of individual cassettes 46.

Figure 8:
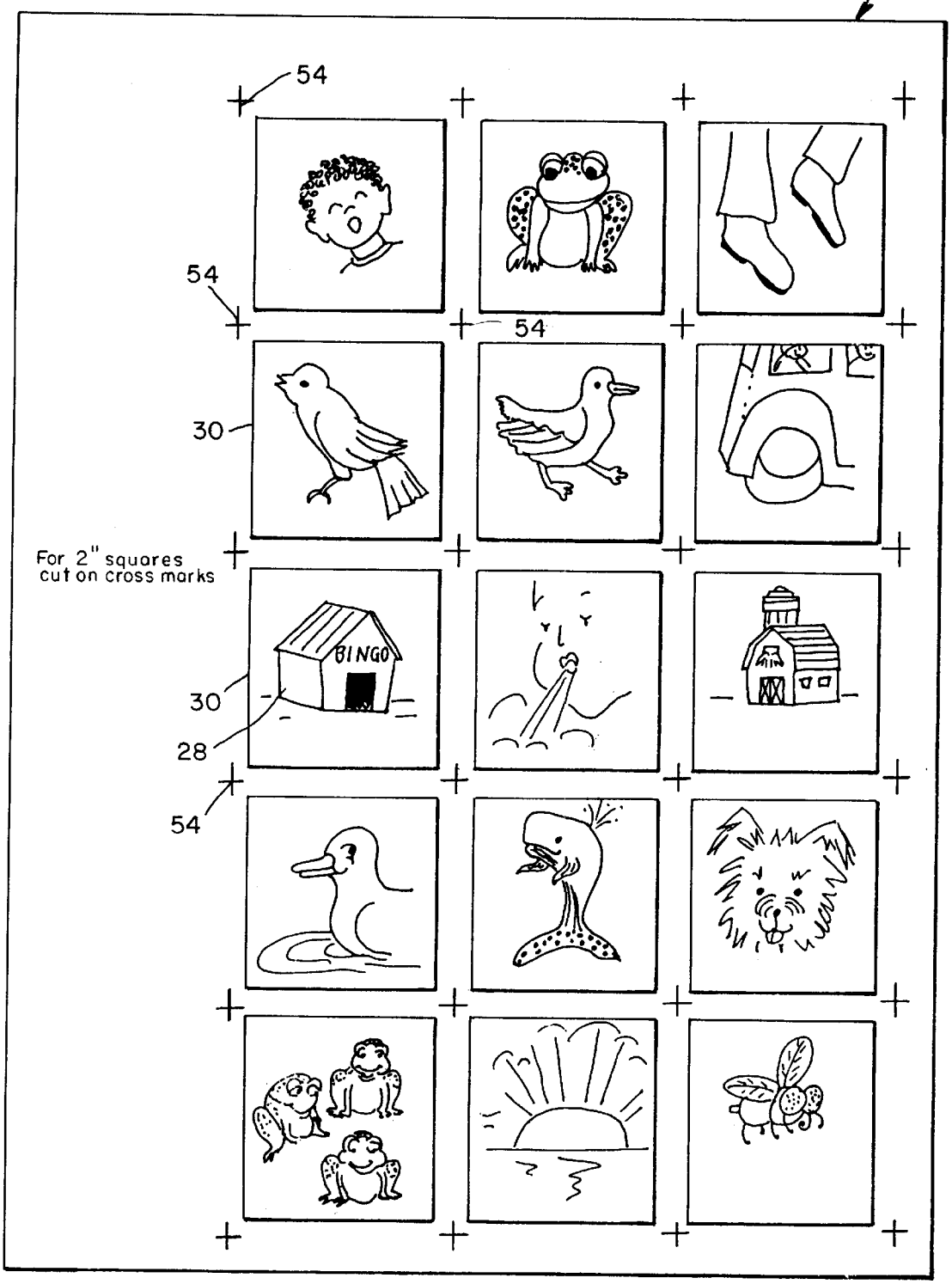
FIG. 8 is an example of a master sheet of the icons represented on the plurality of icon cards of FIG. 6.

(4) A set of the icon cards 48 represented in FIG. 6, one icon card for each song in the song book 10. Alternatively, as shown in FIG. 8, the kit may include master sheets 52 of icons 28 (preferably with borders or enclosures 30 similar to the borders or enclosures about the icons 28 in the song book 10 and on the cassettes 46) corresponding to the icons on the pages of the song book 10, each sheet 52 being marked with cross marks or other indicia 54 for permitting the teacher to cut therealong to form the icon cards 48. The icon cards 48, or the icons 28 on the master icon sheet 52, may be utilized for making icon labels for attachment to the individual cassettes 46, or such labels may be supplied as a part of the kit.

Although the preferred embodiments of the method and kit of the present invention utilize tape cassette recordings, other types of recording systems and media may be utilized. For example, phonograph records, or compact discs or other digitally encoded media, may be used for the master sound recording of the songs, as well as for the individual sound recordings of the respective songs. Further, depending upon the capabilities of the students, systems and media utilizing computer access may be appropriate.

Thus, there has been described preferred embodiments of a method and kit for teaching disabled students through music. Other embodiments of the method and kit of the present invention, and other variations of the embodiments described herein, may be developed without departing from the essential characteristics thereof. Accordingly, the invention should be limited only by the scope of the claims listed below.

I claim:

1. A method of teaching disabled students through music, comprising:

providing each student with a song book including pages each having printed thereon the title of a different song of a plurality of songs, the lyrics of that song, and an icon representing that song from a plurality of icons respectively representing said songs;

providing sound recordings of performances of said songs the lyrics of which are printed on said pages;

providing a plurality of icon cards each having thereon a one of said icons;

selecting one of said icon cards for identifying a song represented by the icon on the selected icon card;

displaying to the students the selected icon card for permitting each student to find the page in his or her song book having thereon the title and lyrics of the identified song by matching the icon on the displayed icon card to one of the icons on the pages of his or her song book; and playing back the sound recording of the song identified by the icon on the selected icon card.

2. The method according to claim 1, further including:

encouraging the students to sing along to the recording being played back.

3. The method according to claim 1, wherein:

one of the students selecting the icon card during the selecting step.

4. The method according to claim 1, further including:

the students viewing the page with the matched icon during the playing back step.

5. The method according to claim 1, further including:

providing to a teacher an activity book including first pages respectively having printed thereon the title and lyrics of said songs, said activity book including second pages in respective correspondence with said first pages and having printed thereon suggested activities that may be implemented in connection with a performance of the song the lyrics of which are printed on a corresponding one of said first pages.

6. The method according to claim 5, further including:

the teacher selecting an activity from the second page of said activity book corresponding to the first page having thereon the lyrics of the identified song; and the teacher implementing the selected activity with the students during the recording playing back step.

7. The method according to claim 1, wherein:

said sound recordings provided comprise individual recordings of respective ones of said songs, the packaging of each of said individual recordings being marked with the icon representing the song on that particular recording.

8. The method according to claim 7, further including:

one of the students matching the icon on the displayed icon card with an icon on the package of a one of the individual recordings for identifying the recording to be played back.

9. The method according to claim 8, further including the student handing the identified sound recording to a teacher;

and wherein the teacher causing said identified sound recording to be played back during the playing back step.

10. The method according to claim 8, wherein:

the student causing the identified sound recording to be played back during the playing back step.

11. A method of teaching a disabled student through music, comprising:

providing the student with a song book including pages each having printed thereon the title of a one song of a plurality of songs, the lyrics of that song, and a one icon representing that song of a plurality of icons respectively representing said songs;

providing a plurality of sound recordings of performances of said songs the lyrics of which are printed on said pages, the packaging of each of said recordings marked with the icon representing the song on that recording;

the student matching the icon on a one of said pages of said song book to the icon on the packaging of a one of said recordings; and playing back the recording having the matched icon.

12. The method according to claim 11, wherein:

the student causing said sound recording having the matched icon to be played back during the playing back step.

13. The method according to claim 11, further including the student handing said sound recording having the matched icon to a teacher;

and wherein the teacher causing said sound recording having the matched icon to be played back during the playing back step.

14. A kit for teaching disabled students through music, comprising the combination of:

at least one song book including pages each having printed thereon the title of a one song of a plurality of songs, the lyrics of that song, and a one icon representing that song of a plurality of icons respectively representing said songs;

sound recordings of performances of said songs the lyrics of which are printed on said pages; and a plurality of icon cards each having thereon a one of said icons.

15. The kit according to claim 14, wherein:

said pages of said song book having printed thereon illustrations corresponding in location and context to said lyrics.

16. The kit according to claim 14, wherein:

said sound recordings comprise a master recording of performances of at least some of said songs.

17. The kit according to claim 14, wherein:

said sound recordings comprise individual recordings of respective ones of said songs, the packaging of each of said individual recordings being marked with the icon representing the song on that individual recording.

18. The kit according to claim 17, wherein:

each one of said icons on said pages of said song book is contained within a graphic border.

19. The kit according to claim 18, wherein:

each one of said icons on said icon cards is contained within a graphic border similar to the graphic borders on said pages.

20. The kit according to claim 18, wherein:

each one of said icons on the packaging of said individual recordings is contained within a graphic border similar to the graphic borders on said pages.

21. The kit according to claim 14, further including:

an activity book including first pages respectively having printed thereon the tide and lyrics of said songs, said activity book including second pages in respective correspondence with said first pages and having printed thereon suggested activities that may be implemented in connection with a performance of the song the lyrics of which are printed on a corresponding one of said first pages.

22. The kit according to claim 21, wherein:

said pages of said song book and said first pages of said activity book have printed thereon illustrations corresponding in location and context to said lyrics.

23. A kit for teaching a disabled student through music, comprising the combination of:

a plurality of sound recordings of performances of songs, each of said sound recordings having packaging marked with an icon representing the song on that recording of a plurality of icons respectively representing said songs; and a song book including pages each having printed thereon the title of a one of said songs, the lyrics of that song and the icon representing that song.

24. The kit according to claim 23, wherein said pages of said song book have printed thereon illustrations corresponding in location and context to said lyrics.

25. The kit according to claim 23, further including:

a plurality of icon cards each having thereon a one of said icons.

26. The kit according to claim 23, wherein:

each of said icons on said pages of said song book is contained within a graphic border.

27. The kit according to claim 25, wherein:

each of said icons on said icon cards is contained within a graphic border similar to the graphic borders on said pages.

28. The kit according to claim 23, wherein:

each of said icons on the packaging of said recordings is contained within a graphic border similar to the graphic borders on said pages.

29. The kit according to claim 23, further including:

an activity book including first pages respectively having printed thereon the title and lyrics of said songs, said activity book including second pages in respective correspondence with said first pages and having printed thereon suggested activities that may be implemented in connection with a performance of the song the lyrics of which are printed on a corresponding one of said first pages.

30. The kit according to claim 29, further including:

a plurality of icon cards each having thereon a one of said icons.

31. The kit according to claim 29, wherein:

said pages of said song book and said first pages of said activity book have printed thereon illustrations corresponding in location and context to said lyrics.

* * * * *